(12) United States Patent
Krüger

(10) Patent No.: US 6,250,842 B1
(45) Date of Patent: Jun. 26, 2001

(54) DEVICE FOR THE RELEASABLE FASTENING OF SEATS, BENCH SEATS OR OTHER OBJECTS ON THE FLOOR OF A MOTOR VEHICLE

(75) Inventor: Norbert Krüger, Essen (DE)

(73) Assignee: Ewald Witte GmbH & Co. KG, Velbert (DE)

( * ) Notice: Subject to any disclaimer, the term of this patent is extended or adjusted under 35 U.S.C. 154(b) by 0 days.

(21) Appl. No.: 09/204,097

(22) Filed: Dec. 1, 1998

(30) Foreign Application Priority Data

Dec. 3, 1997 (DE) .............................. 197 33 538

(51) Int. Cl.[7] .............................. B25G 3/00; F16G 11/00; F16B 00/00
(52) U.S. Cl. ........................ 403/315; 403/33; 403/349; 403/316; 403/319; 403/322.1; 403/353; 297/440.13; 297/440.15; 297/335
(58) Field of Search ................... 403/321, 325, 403/353, 349, 322.1, 315, 319, 316; 297/440.13, 440.15, 344, 195.13, 195.15, 335

(56) References Cited

U.S. PATENT DOCUMENTS

| 2,734,764 | * | 2/1956 | Angelo | 292/333 |
| 4,308,680 | * | 1/1982 | Aboudi | 40/613 |
| 4,386,871 | * | 6/1983 | Hooker et al. | 403/377 |
| 4,455,723 | * | 6/1984 | Umetsu | 403/353 |
| 4,588,866 | * | 5/1986 | Monti | 179/100 R |
| 4,597,599 | * | 7/1986 | Bisbing | 292/174 |
| 5,281,044 | * | 1/1994 | Chen | 403/328 |
| 5,542,720 | * | 8/1996 | Fleming | 292/32 |
| 5,971,490 | * | 10/1999 | Chang | 297/473 |

FOREIGN PATENT DOCUMENTS

2228527 * 8/1990 (GB) .

* cited by examiner

Primary Examiner—Lynne H. Browne
Assistant Examiner—Ernesto Garcia
(74) Attorney, Agent, or Firm—Martin A. Farber

(57) ABSTRACT

A device for the releasable fastening of seats, bench seats or other objects on a floor of a motor vehicle, comprising a locking part, and a mating locking part which can be fastened to the floor. The locking part is movable by overcoming a spring force from a locking position, in which it cannot be uncoupled from the mating locking part, into a release position in which it can be uncoupled from the mating locking part. A blocking element, upon the uncoupling, retains the locking part in the release position by a positively locking interengagement.

14 Claims, 4 Drawing Sheets

DEVICE FOR THE RELEASABLE
FASTENING OF SEATS, BENCH SEATS OR
OTHER OBJECTS ON THE FLOOR OF A
MOTOR VEHICLE

FIELD AND BACKGROUND OF THE INVENTION

The invention relates to a device for the releasable fastening of seats, bench seats or other objects on the floor of a motor vehicle, comprising a locking part and a mating locking part which can be fixedly connected to the floor, wherein the locking part can be moved, by overcoming a spring force, from a locking position, in which it cannot be uncoupled from the mating locking part, into a release position, in which it can be uncoupled from the mating locking part.

In the case of known configurations available on the market the operation of coupling the locking part and mating locking part, in particular, is laborious since the mating locking part has to be moved into the release position at the same time.

SUMMARY OF THE INVENTION

It is an object of the invention to provide a device of the above-mentioned type of user-friendly construction, so as to render easier, in particular, the operation of coupling the locking part and mating locking part.

According to the invention there is provided a blocking element which, upon uncoupling, retains the locking part in the release position by positively locking interengagement.

Such a development provides a device of the introductory-mentioned type which is of user-friendly construction. If it is desired, for example, to pivot a bench seat in order to increase the loading space within a motor vehicle, first of all the relevant locking parts have to be moved into the release position, whereupon the bench seat can be pivoted, together with uncoupling of the locking parts from the mating locking parts on the vehicle floor. During the uncoupling operation, the blocking element associated with each device passes into the locking part in a positively locking manner with a cooperating form-locking of the locking part and the blocking element and retains the locking part in the release position. This means that, upon bringing about of the coupling position of the locking part and mating locking part, it is not necessary for the locking part to be moved into the release position. As the coupling position of the locking part and mating locking part is brought about, the blocking element is disengaged in the end phase, with the result that the locking part passes, with spring actuation, into its locking position. This likewise ensures that if, in the case of a bench seat, a plurality of these devices are provided, the locking position is only established when the locking part and mating locking part pass into positively locking engagement with one another as intended. It is advantageous to construct the locking part as a locking plate, with the result that high forces which counteract the locking can be absorbed. This is also assisted by the fact that the mating locking part is configured as a clamp which is provided with a mushroom head and interacts with the locking plate by way of an elongated slot connection. In order to bring about the coupling position between the locking part and mating locking part, the locking part is to be displaced in that the mushroom head passes through a cross-sectionally enlarged region of a corresponding slot of varying cross-section. After passing along the mushroom head, the locking plate, which is formed as a locking part, can pass into positively locking connection by spring force. So that, in the uncoupled position, the locking plate cannot advance as the result of its spring loading, the blocking element is a spring-actuated pin which, in the uncoupled, release position, penetrates into an opening of the locking plate and fixes the same. The locking plate is easily prevented from advancing here in that the opening has a transverse niche in which, in the uncoupled, release position, the pin is positioned. In the coupled, locking position, on the other hand, the pin is forced out by a protrusion which engages in the opening. This takes place such that, upon coupling of the locking part and mating locking part, the protrusion pushes the pin out of the transverse niche of the opening and frees the locking plate for spring-loaded advancement. The pin forms a blocking web which is directed toward the locking plate and is intended for passing into the transverse niche. It is only once the blocking web and the transverse niche have been aligned, to be precise following the prior disengagement action of the locking plate, that, upon the following uncoupling action, the blocking web can pass into the transverse niche, while the protrusion releases the opening at the same time. In order that the blocking web and the transverse niche are always correctly aligned, the pin is unable to rotate. The protrusion is formed here by a rivet which is connected to a trapezoidally bent base plate. This base plate stabilizes the clamp, which is connected to the vehicle floor, in that the base plate forms a bayonet slot for the through-passage and support of a collar which is formed by the mating locking part and is spaced apart in parallel from the mushroom head. Accordingly, any loading to which the mating locking part is subjected is also transferred into the base plate, which may be connected to the vehicle floor, with the result that the forces are distributed over a greater area. Finally, it is also advantageous to provide a securing plate which is fixed by the rivet and covers the open free space of the bayonet slot of the base plate. The rivet accordingly fulfills a double function: on the one hand it forms the protrusion, and on the other hand it is used for retaining the securing plate.

BRIEF DESCRIPTION OF THE DRAWINGS

With the above and other objects and other advantages in view, the present invention will become more clearly understood in connection with the detailed description of the preferred embodiment, when considered with the accompanying drawings of which

DETAILED DESCRIPTION OF THE PREFERRED EMBODIMENT

Figure 1:
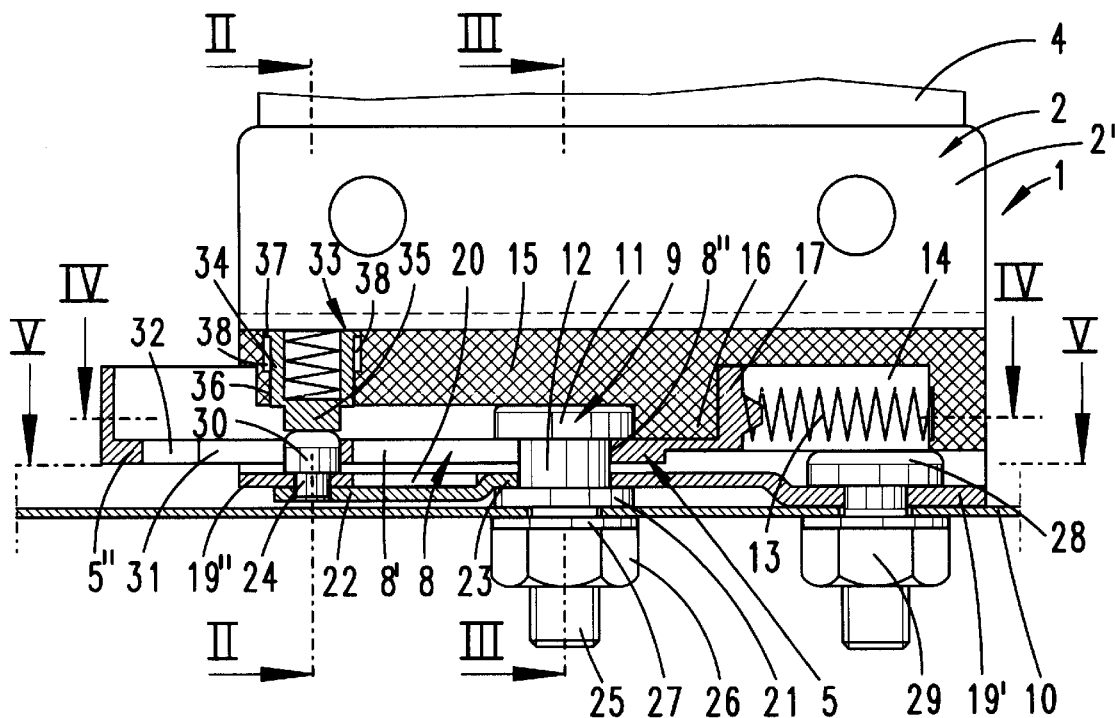
FIG. 1 shows a longitudinal section through a device which is designed according to the invention and is intended for the releasable fastening of a bench seat.
Figure 2:
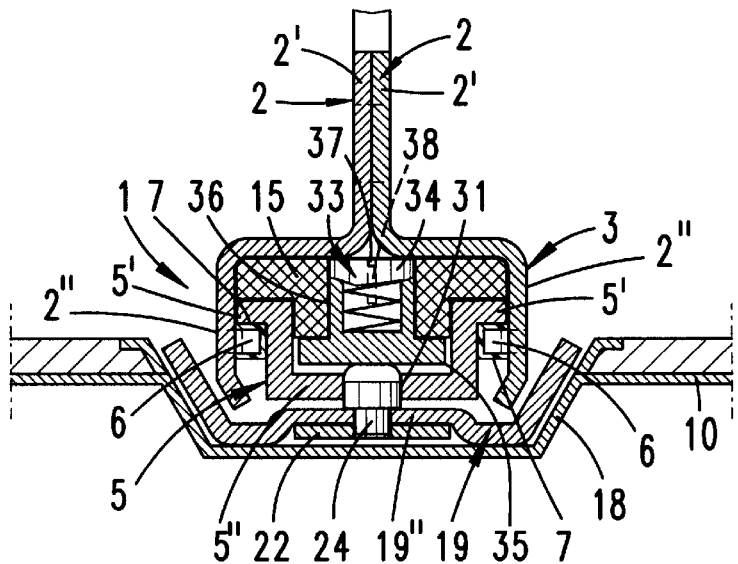
FIG. 2 shows the section along line II—II in FIG. 1.
Figure 3:
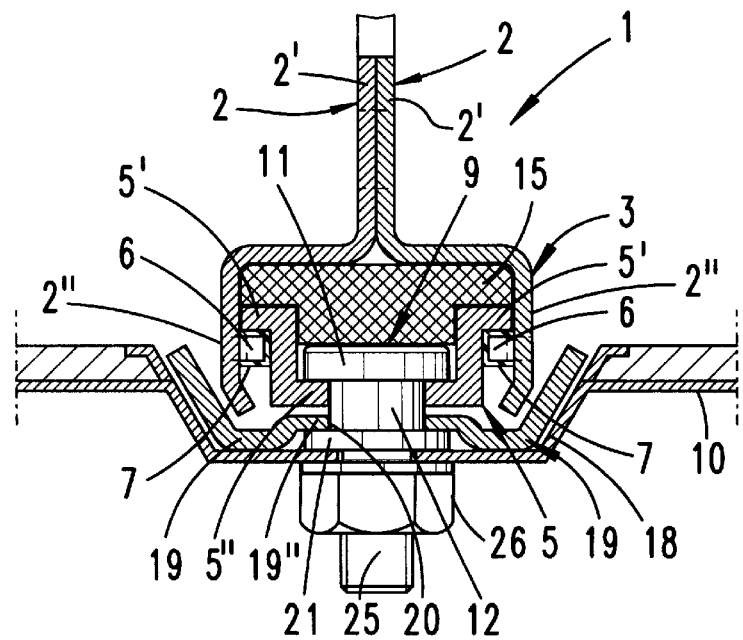
FIG. 3 shows the section along line III—III in FIG. 1.
Figure 4:
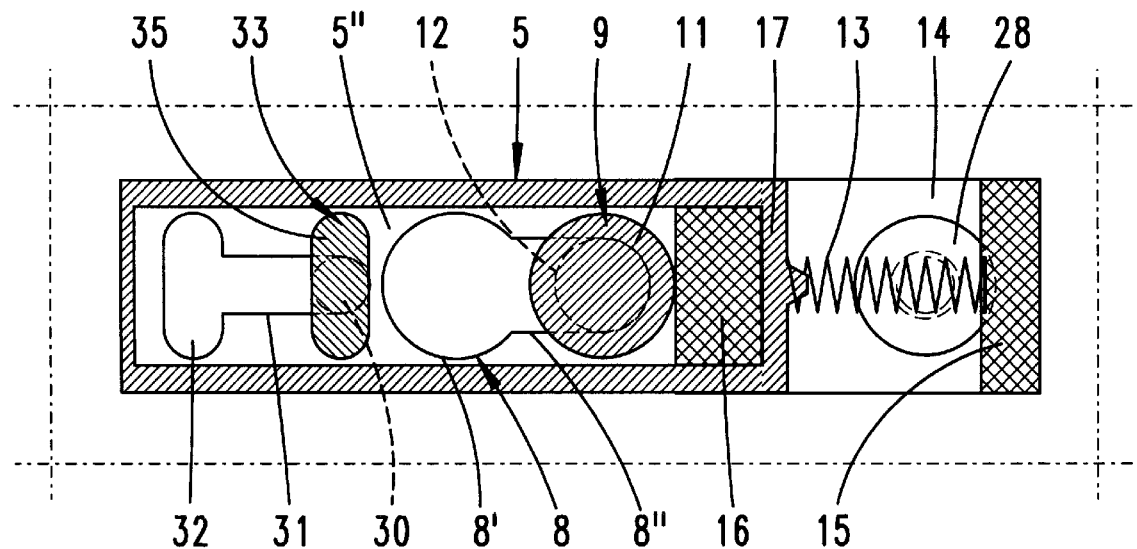
FIG. 4 shows the section along line IV—IV in FIG. 1, the locking plate assuming the locking position.
Figure 5:
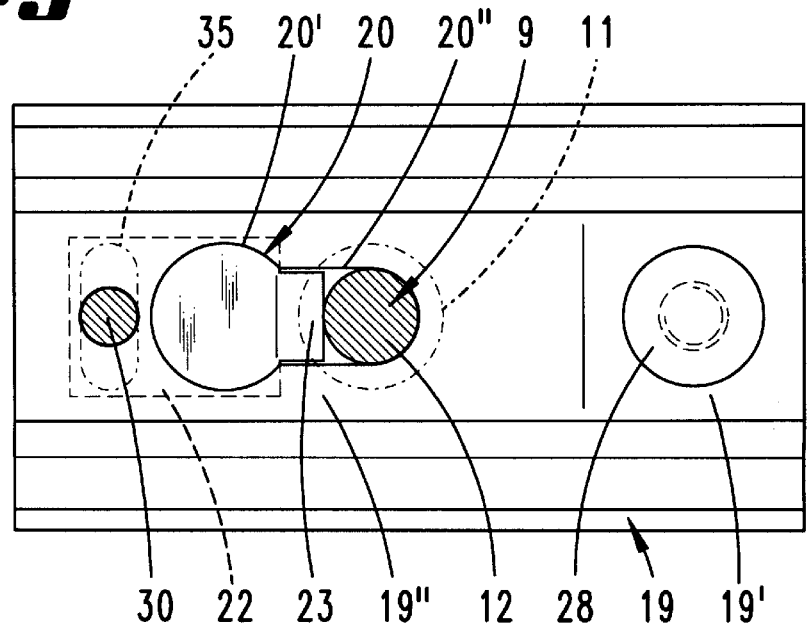
FIG. 5 shows the section along line V—V in FIG. 1, with a view of the base plate, fastened on the floor panel, for fixing the mating locking part.

The device is designated as a whole by the designation 1. For a bench seat, use is made, for example, of six such devices, to be precise three in each case on one longitudinal side of the bench seat.

Each device 1 has two angled elements 2 which are connected to one another, are bent in the form of a Z and form a housing 3 with their bottom region. The abutting legs 2' of the angled elements 2 are screwed to a foot support 4 of the bench seat (not illustrated). The locking mechanism is located between the legs 2" of the angled elements 2, said legs being located at a greater distance 7 apart from one another. The locking mechanism comprises a locking part 5 which is guided between the legs 2" and is designed as a locking plate. The locking part is guided in a longitudinally displaceable manner between the legs 2", for which purpose inwardly oriented guide strips 6 extend from the legs 2". The guide strips are covered by means of plastic U-rails 7. The locking part 5, or the locking plate, is likewise configured in the form of a U in cross section, such that the U-legs are guided on the U-rails 7. Provided on the U-legs of the locking part 5 are outwardly oriented angled-off sections 5', which grip over the U-rails 7.

Located in the U-web 5" is a bayonet slot 8 in the form of a keyhole. In specific terms, the bayonet slot 8 is made up of a circular section 8' with a flange section 8" which is directed radially with respect to the section 8' and runs in the direction of displacement of the locking plate 5. This bayonet slot 8 interacts with a mating locking part 9 which is secured to the vehicle floor. The mating locking part is provided with a mushroom head 11 which projects beyond the vehicle floor 10. The diameter of said mushroom head is somewhat smaller than that of the circular section 8' of the bayonet slot. The mushroom head 11 is adjoined by a reduced-diameter section 12, of which the diameter is somewhat smaller than the width of the flange section 8". In the locking position of the locking plate 5, the section 12 extends within the flange section 8", while the mushroom head 11 grips over that region of the locking plate 5 which is located to the sides of the flange section 8", see FIG. 1. This is the locking position of the locking plate 5. The locking plate 5 is actuated by a compression spring 13 into this locking position. The compression spring 13 is accommodated by a cutout 14 of a filler plate 15 which grips over the locking plate 5 and fills the rest of the space, above the locking plate 5, between the legs 2". Arranged behind the cutout 14 is a stop protrusion 16, which extends right up to the mushroom head 11 and interacts with a rear border edge 17 of the locking plate 5. The filler plate 15 is fixedly connected to the housing 3 in a manner which is not depicted.

The vehicle floor 10 is profiled trapezoidally in the region of the mating locking part 9 and thus forms a channel 18 which runs in the vehicle direction and into which a trapezoidal base plate 19 is fitted. The base plate is profiled in the form of Z in the longitudinal direction such that the region 19', which is located beneath the compression spring 13, butts flush against the vehicle floor 10 and respectively against the base of the channel 18. The region 19" of the base plate 19, said region being spaced apart in parallel from the region 19', is likewise provided with a bayonet slot 20. The latter is configured in the manner of a keyhole and has a circular section 20' with a flange section 20" extending radially with respect to the same. The diameter of the circular section 20' is of such a magnitude that the mushroom head 11 of the mating locking part 9 can pass through the same, while the flange section 20" is adapted to the diameter of the section 12. When the base plate 19 has been fitted, the section 12 extends in the region of the flange section 20". At a distance from the mushroom head 11, and parallel thereto, the section 12 continues into a collar 21, which projects beyond said section 12, projects beneath the border region of the flange section 20" and fills the spacing between the base of the channel 18 and the underside of the region 19" of the base plate 19. In its position in which it has been pushed into the flange section 20", the mating locking part 9 is retained by securing plate 22, which has an angled-off tongue 23 which projects into the bayonet slot 20, above the collar 21, and extends right up to the lateral surface of the section 12. The securing plate 22 is wider than the bayonet slot 20 and covers the latter. A rivet 24 fixes the securing plate 22 on the base plate 19. This makes it possible for the base plate 19, together with the mating locking part 9, to be coordinated, as an installation unit, to the vehicle floor 10, to be precise by way of a screw connection. For this purpose, the mating locking part 9 continues into a screw-pin 25, which engages through the vehicle floor 10. The mating locking part 9 is then secured by a nut 26 which, with the interposition of a washer 27, is braced against the vehicle floor 10. The front region 19' of the base plate 19 is likewise secured on the vehicle floor 10 by means of a screw 28 and nut 29. Accordingly, pulling-out forces which act on the mating locking part 9 are absorbed both by the vehicle floor 10 and by the base plate 19, which is screwed to the latter.

The rivet 24 continues into a cross-sectionally circular protrusion 30 which projects beyond the base plate 19 and, in the locking position of the locking plate 5, engages in one end of a slot-like opening 31 such that the free end surface of the protrusion 30 is located approximately flush with that surface of the locking plate 5 which faces it. The opposite end of the opening 31, in contrast, continues into a transverse niche 32. A blocking element 33 interacts with said transverse niche and the protrusion 30. Said blocking element is a spring-actuated pin 34 which, at its end which is directed toward the locking plate 5, forms a blocking web 35 for through-passage into the transverse niche 32. The pin 34 is guided in a bore 36 of the filler plate 15. Diametrical rotation-prevention protrusions 37 extend radially from the top end of the pin 34 and are guided in radial cutouts 38 of the bore 36. In the locking position, the blocking web 35 is supported on the protrusion 30, see FIG. 1.

Figure 6:
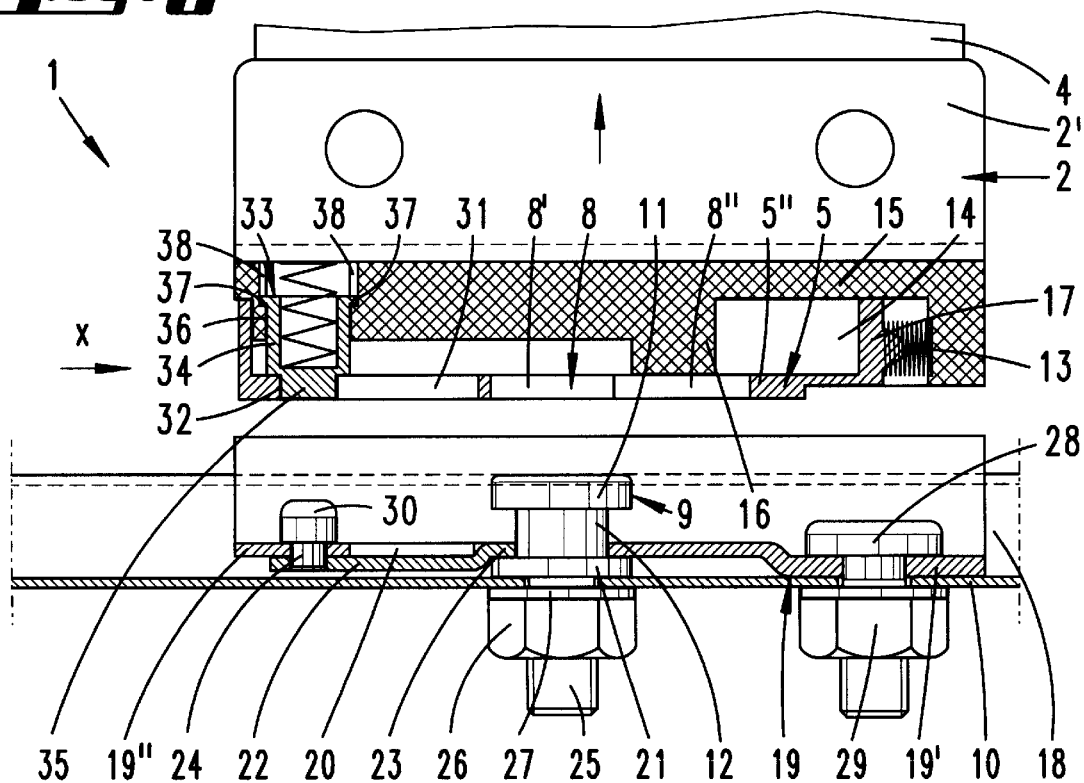
FIG. 6 shows an illustration like that in FIG. 1, but with the locking part displaced into the release position, the bench seat raised and, in the process, the blocking element passed into the blocking position in relation to the locking part.
Figure 7:
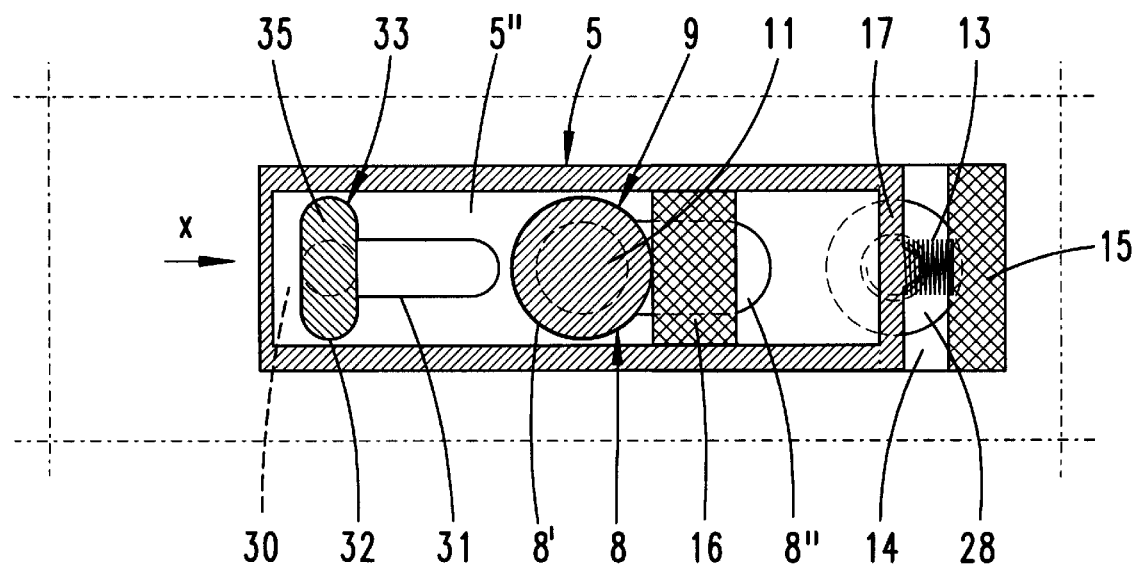
FIG. 7 shows an illustration corresponding to FIG. 4, but with the locking plate displaced into the release position.

The invention functions as follows:

In order to raise or pivot the bench seat, the locking plate 5 has to be displaced, counter to spring action, in the arrow direction x indicated in FIG. 6. In this case, the circle section 8' of the bayonet slot 8' passes into alignment with the mushroom head 11. Furthermore, along with this displacement, the transverse niche 32 has moved into alignment with the blocking web 35 of the blocking element 33. If the bench seat is then raised or pivoted, the mushroom head 11 of the mating locking part 9 passes through the circular section 8' of the bayonet slot. Furthermore, as a result of spring actuation of the blocking element 33, the blocking web 35 penetrates into the transverse niche 32 and fixes the locking plate 5 in its release position, see FIGS. 6 and 7.

Upon entering the coupling position between the mating locking part 9 and locking part or locking plate 5, the mushroom head 11 passes into the circular section 8' of the bayonet slot 8. Furthermore, the rivet protrusion 30 acts on the blocking element 33, on the blocking web 35, and displaces the same out of the transverse niche 32, with the result that, once passage through the circular section 8' is complete, the blocking element 33 is also disengaged from the opening 31 and respectively the transverse niche 32 thereof, whereupon the compression spring 13, which subjects the locking plate 5 to loading, can go into action, so that the engagement between the locking plate 5 and mating locking part 9 is produced. This ensures that, when a bench seat is placed in position, the locking parts or locking plates 5 correctly assume their rear-engagement position with respect to the mating locking parts 9 associated with them. This operation can be carried out quickly. If there are a plurality of devices provided in a row, it is recommended to disengage the relevant locking plates via a hand grip which is associated with common to all of them.

What is claimed is:

1. A device for the releasable fastening of a member comprising seats, bench seats and other objects on a floor (10) of a motor vehicle, comprising:
   a first locking part (5), a blocking element (33), and a housing (3) enclosing the first locking part (5) and the blocking element, the first locking part comprising a locking plate;
   a mating locking part (9) fixedly connectable to the floor and being spaced apart from the blocking element in a direction parallel to the floor (10), the first locking part (5) being movable in a direction parallel to the floor, by overcoming a spring force, from a locking position, in which locking position the first locking part cannot be uncoupled from the mating locking part (9), into a release position wherein the first locking part can be uncoupled from the mating locking part; a trapezoidally bent base plate securable between the locking plate and the floor by the mating locking plate; and
   a protrusion supported by the bent base plate and being (30) spaced apart, in a direction parallel to the floor, from the mating locking part and extending toward the housing, wherein the blocking element (33), upon an uncoupling of said first locking part from said mating locking part, is urged by a spring force to penetrate an opening (31) of the first locking part to hold the first locking part in a release position and, during a coupling of the first locking part with the mating locking part, is displaced out of the opening (31) by the protrusion.

2. The device as claimed in claim 1, wherein the mating locking part (9) is a clamp provided with a mushroom head (11), said head interacting with the first locking plate (5) by an elongated slot connection.

3. The device as claimed in claim 1, wherein said first locking part is formed with said opening (31), and wherein the blocking element (33) is a spring-actuated pin (34) which, in an uncoupled, release position, projects into said opening (31) of the first locking part (5); and wherein the housing has a bore (36) for receiving the pin (34), the pin including diametrically protruding elements (37) received in radial cutouts (38) of the bore (36).

4. The device as claimed in claim 3, wherein the opening (31) in said first locking part has a transverse niche (32) in which niche, in an uncoupled, release position, the pin (34) is positioned constituting the positively locking interengagement with said first locking part.

5. The device as claimed in claim 4, wherein the protrusion (30), in a coupled, locking position, engages in the opening (31).

6. The device as claimed in claim 5, wherein, upon coupling of the first locking part (5) and mating locking part (9), the protrusion (30) presses the pin (34) out of the traverse niche (32) of the opening (31) and frees the first locking part (5) for spring-loaded advancement into said locking position by said spring force.

7. The device as claimed in claim 4, wherein the pin (34) forms a blocking web (35), said blocking web is directed toward the locking plate (5) and is positioned into the transverse niche (32) in said uncoupled, release position.

8. The device as claimed in claim 4, wherein the pin (34) is non-rotatable.

9. The device as claimed in claim 5, wherein the protrusion (30) is a rivet (24) connected to said bent base plate (19).

10. A device for the releasable fastening of a member comprising seats, bench seats and other objects on a floor (10) of a motor vehicle, comprising:
    a first locking part (5), a blocking element, and a housing enclosing the first locking part and the blocking element;
    a mating locking part (9) fixedly connectable to the floor (10), the first locking part (5) being movable, by overcoming a spring force, from a locking position, in which locking position the first locking part cannot be uncoupled from the mating locking part (9), into a release position wherein the first locking part can be uncoupled from the mating locking part;
    a protrusion (30) spaced from the mating locking part and extending toward the housing, wherein the blocking element (33), upon an uncoupling of said first locking part from said mating locking part, penetrates an opening (31) of the first locking part to hold the first locking part in a release position and, during a coupling of the first locking part with the mating locking part, is displaced out of the opening (31) by the protrusion;
    wherein the first locking part (5) comprises a locking plate;
    wherein said first locking part is formed with said opening (31), and wherein the blocking element (33) is a spring-actuated pin (34) which, in an uncoupled, release position, projects into said opening (31) of the first locking part (5); and wherein the housing has a bore (36) receiving the pin (34), the pin including diametrically protruding elements (37) received in radial cutouts (38) of the bore (36);
    wherein the opening (31) has a transverse niche (32) in which niche, in an uncoupled release position, the pin (34) is positioned constituting the positively locking interengagement;
    wherein the protrusion (30), in a coupled, locking position, engages in the opening (31);
    wherein the device further comprises a trapezoidally bent base plate (19), and wherein the protrusion (30) is a rivet (24) connected to said bent base plate (19); and
    wherein the base plate (19) has a slot (20) for through-passage and support of a collar and, said collar (21) is formed by the mating locking part (9) and is spaced apart in parallel from a mushroom head (11) of the mating locking part, said head coupling with said first locking part in the locking position.

11. The device as claimed in claim 10, further comprising a securing plate (22) which is fixed by the rivet (24) and covers open free space of the slot (20) of the base plate (19).

12. The device as claimed in claim 1, wherein holding of said first locking part in the release position by said blocking element is accomplished by a cooperating form-locking engagement of said blocking element and said first locking part.

13. The device as claimed in claim 1, wherein said first locking part is moveably mounted in said housing, said blocking element is moveably mounted within said housing, and said housing is connectable to said member.

14. The device as claimed in claim 13, wherein said blocking element is movable within said housing in a substantially transverse direction to the direction of movement of said first locking part in said housing.

* * * * *

UNITED STATES PATENT AND TRADEMARK OFFICE
CERTIFICATE OF CORRECTION

PATENT NO.   : 6,250,842 B1
DATED        : June 26, 2001
INVENTOR(S)  : Norbert Krüger It is certified that error appears in the above-identified patent and that said Letters Patent is hereby corrected as shown below:

<u>Title page,</u>
Item [30], Foreign Application Priority Data, change "197 33 538" to -- 197 53 538 --

Signed and Sealed this

Fifteenth Day of October, 2002

*Attest:*

JAMES E. ROGAN
*Attesting Officer*  *Director of the United States Patent and Trademark Office*